United States Patent
Nilsson

[11] 3,833,288
[45] Sept. 3, 1974

[54] MEANS FOR PRODUCING A CONTROLLABLE SCATTERING OF LIGHT

[76] Inventor: Björn Olle Nilsson, Dr. Forselius gata 50, 413 26 Goteborg, Sweden

[22] Filed: Nov. 24, 1972

[21] Appl. No.: 309,029

[52] U.S. Cl. .......................... 350/188, 350/160 LC
[51] Int. Cl. .............................................. G02b 5/02
[58] Field of Search ...................... 350/188, 160 LC

[56] References Cited
UNITED STATES PATENTS

| | | | |
|---|---|---|---|
| 3,330,692 | 7/1967 | Ehrlich | 350/188 UX |
| 3,491,237 | 1/1970 | Tillet | 350/188 UX |
| 3,674,338 | 7/1972 | Cartmell et al. | 350/160 LC UX |
| 3,718,078 | 2/1973 | Plummer | 350/188 UX |

Primary Examiner—John K. Corbin
Attorney, Agent, or Firm—Sughrue, Rothwell, Mion, Zinn & Macpeak

[57] ABSTRACT

The invention concerns a method for producing a controllable scattering of light in optic and photographic equipment, without causing any appreciable image distortion wherein a great number of small optic inhomogenities are inserted into the path of light flux. The dimensions and refractive index of said inhomogenities being selected so as to cause a wavelength-depending light scattering substantially free from refraction effects. The invention also includes a device for carrying out the specified method.

10 Claims, No Drawings

MEANS FOR PRODUCING A CONTROLLABLE SCATTERING OF LIGHT

This invention relates to a method for producing a controllable scattering of light, particularly in optic and photographic equipment.

The nature of the human eye is such that when looking at an intense light source surrounded by a dark background the background seems to be covered by a whitish shimmer which disappears when the light source is turned off. Further, halos of a certain structure arise around spotlike light sources. These phenomena are caused by light-scattering microscopic irregularities and tissues in the cornea and the lens of the eye.

To imitate a true visual impression in paintings the artist also reproduces the light which would have been scattered in the human eye. For instance, shadows are not painted too dark and halos are painted around intense light sources. However, in photographic reproduction a picture is obtained which differs from the real visual impression, especially if the motif contains intense light sources or otherwise is contrasty, as the light-scattering in the camera optic normally is negligible.

The main object of the invention is to obtain a method for controllable scattering of light which, among other things, makes it possible to obtain photographic pictures which will give an observer of such a picture a visual impression very closely corresponding to the visual impression of the motif if viewed directly.

According to the invention said object is achieved by inserting into the path of a light flux a great number of small optic inhomogeneities, the dimensions and refractive index of said inhomogeneities being selected so as to cause a wavelength-depending light-scattering substantially free from refraction effects. The scattering caused by these inhomogeneities may be controlled with respect to angular distribution, spectral characteristics and intensity and is based on Fraunhofer-diffraction or, as regards very small inhomogeneities, on Rayleigh-scattering.

According to the invention the light-scattering is primarily intended to imitate the scattering in the human eye and is not to be confused with the fundamentally different effect obtained by means of conventional softening means or diffusion discs intended to soften the contrast at the boundary between dark and bright areas. However, these means the function of which is based mainly on refraction effects normally cause a considerably reduced contour sharpness and, further, the light is scattered over a very narrow angle. According to the invention the scattered light will be distributed over a wide angle and the distribution angle and the intensity will both depend relatively strongly on the wavelength. Any image distortion or any reduction of the contour sharpness except for a certain general reduction of the contrast will not occur as the scattered light is added to a substantially uneffected original image.

Thus the desired nature of the light-scattering is obtained through Fraunhofer-diffraction and Rayleigh-scattering whereas the refraction is kept at a very low level to imitate the nature of the eye in which the variations in refractive index are small. In order to avoid refraction effects the phase displacement of the light caused by an inhomogeneity should not substantially exceed the order of one wavelength. This means that the dimensions of the inhomogeneity in a direction parallel to the light beam shall not exceed the order of $\lambda/\Delta n$ where $\lambda$ is the light wavelength and $\Delta n$ is the difference between the refractive index of the inhomogeneity and the surrounding medium.

The invention also relates to a device for use in carrying out the method above proposed. According to the invention said device consists of an optic element comprising a great number of small optic inhomogeneities adapted to cause a wavelength-depending scattering of light passing through said element, said light-scattering being substantially free from refraction effects.

The inhomogeneities utilized may be formed by particles of glass, plastic, quartz or the like embedded in a layer of a transparent substance applied on a transparent member, e.g. a glass disc, or between two such members. The inhomogeneities may also be formed by small impressions or cavities in a transparent plate or consist of particles in colloid solution in a transparent liquid. Further, the inhomogeneities may consist of the molecular structure of a substance of liquid crystal type.

A preferred embodiment consists of a plane or curved glass or plastic disc having the optic inhomogeneities distributed over its surface or embedded in the glass or plastic material. Preferably, in the first case a protection glass is provided to prevent mechanical damage of and dust accumulation on the light-scattering surface. To obtain the best results all free surfaces should be anti-reflex coated. The optic element may be designed for mounting in optic instruments in the same way as conventional filters.

The dimensions, number and type of inhomogeneities are selected in dependence of the desired scattering characteristics. When using very small inhomogeneities the greatest dimensions of which do not exceed 0.2 micron a substantially isotropic scattering is obtained, particularly of light of short wavelength, i.e. blue and violet light. These small inhomogeneities may be formed by small plastic pellets embedded in a covering substance between two plane glass discs. Naturally, said pellets must not consist of a material having exactly the same refractive index as the covering substance. The greater the pellets are the less should the difference between the refractive index of the material of the pellets and the covering substance be. It is important that the particles are not permitted to clod within the covering substance as, in such a case, the resultant light-scattering would cause a reduction of the sharpness in the same way as a dusty lense surface or a diffusion disc. The covering substance may consist of a hardening plastic cement on which the particles may be sprayed. The inhomogeneities may be formed by very small titanium dioxide particles in colloid solution in ethyl alcohol. Any possible clods are dissolved by subjecting the solution to ultrasonic vibrations. Another suitable covering substance is gelatine. When very small plastic pellets are used these may be distributed over a glass-surface without use of any covering substance. It is also possible to use small quartz particles which may be obtained through a reaction between gaseous silicon tetrachloride and water vapour. As, contrarily to plastic pellets, such particles resist high temperatures they may well be embedded directly in the glass material.

Larger essentially spherical inhomogeneities of the order of 1–10 microns which may consist of an emulsion of plastic particles cause continuous halos around intense concentrated light sources and reduce the contrast at the boundary between dark and bright areas. The radial extension of the halos will be inversely proportional to the diameter of said particles.

Elongated inhomogeneities, such as glass fibres having transverse dimensions not exceeding the order of 10 microns and a length of about 1 mm embedded in a covering substance will cause halos of certain structure around intense light sources. In this case the covering substance is of special importance. If the glass fibres are surrounded by air they will cause a light-scattering of the same type as obtained from a scratched lens, which means that the halos will not be limited in a radial direction as in the human eye. The covering substance may consist of a hardening plastic material.

To imitate the nature of the eye both very small inhomogeneities and elongated inhomogeneities are used at the same time and preferably embedded in a common plastic material.

To cause halos of well-defined limited size the inhomogeneities should have a refractive index only slightly differing from that of the surrounding medium. Preferably, the difference should not exceed 0.05. Red light will be scattered over a wide angle and violet light over a more narrow angle.

If the inhomogeneities are distributed at random over the cross-sectional area of the light path the intensity I of the scattered light will approximately follow the following condition provided that the above mentioned difference in refractive index is very small.

$$I \sim N(V\Delta n)^2 \cdot f^4$$

where $N$ is the number of light-scattering inhomogeneities, $V$ is the volume of the individual inhomogeneity, $\Delta n$ is the difference between the refractive index of the inhomogeneity and the surrounding medium and $f$ is the frequency of light.

If the dimensions of the inhomogeneities in the direction of the light beam do not substantially exceed the shortest dimension in the transverse direction almost all scattered light will fall within an angle of about $\lambda/d$ radians from the direct ray, where $\lambda$ is the light wavelength and $d$ is the smallest dimension of the inhomogeneity transversely to the beam. Also in this case $\Delta n$ should be very small.

The light-scattering inhomogeneities which normally should be equally distributed over the beam path may be contained in any of the optic elements of an optic instrument. However, in practice the inhomogeneities may preferably be provided in a separate filter unit, which may be attached to a camera or the like in the same manner as conventional filters. Such a filter may be used to obtain more realistic pictures and also as a means for avoiding too great contrasts, especially in colour photography. Further, such a filter may also be used instead of softening devices in portrait photography and in advertising photography to cause conspicuous effects if the inhomogeneities are appropriately selected. Specially designed filters may be used in science for certain determination and calibration purposes. Naturally, filters according to the invention may be used not only for still picture cameras but also for film cameras, television cameras, enlarging apparatus and the like. Additionally, it is possible to provide conventional filters or the like with inhomogeneities of the type above described to obtain a combined filter effect. Further, if desired the distribution of the inhomogeneities may be varied over the cross-sectional area of the light beam path to cause an effect varying in dependence of the aperture of an optic system.

I claim:

1. An optical device for controllably scattering light in optical and photographic apparatus to simulate the light scattering naturally caused by the human eye when viewing a source of light closely adjacent a darker background, without causing any significant image distortion, comprising; a substantially transparent optical element completely surrounding a plurality of very small optical inhomogeneities to isolate said inhomogeneities from contact with the surrounding atmosphere, adapted to be inserted in the path of light rays emanating from an image, wherein the dimensions of the inhomogeneities in a first direction substantially perpendicular to the light rays are less than 10 microns, and the product of the dimensions of the inhomogeneities in a second direction substantially parallel to the light rays and the difference between the refractive index of the inhomogeneities and the surrounding medium is less than one wavelength.

2. A device according to claim 1, wherein the cross-sectional dimensions of the inhomogeneities in any plane are less than 10 microns.

3. A device according to claim 2, wherein at least some of the inhomogeneities have a length of the order of 1 mm in a direction perpendicular to the light rays.

4. A device according to claim 2, wherein the greatest dimension of the inhomogeneities is less than 0.2 micron, to thereby cause an essentially isotropic scattering of light of short wavelength.

5. A device according to claim 1, wherein the element contains both substantially spherical inhomogeneities which cause a substantially isotropic light-scattering, and elongated substantially cylindrical inhomogeneities having a length on the order of 1 mm and transverse dimensions not exceeding the order of 10 microns.

6. A device according to claim 1 wherein the dimension of the inhomogeneities in a direction substantially parallel to the light rays exceeds the order of 1 micron and the inhomogeneities are embedded in a substance having a refractive index differing only slightly from that of the inhomogeneities.

7. A device according to claim 1, wherein the distribution of the inhomogeneities varies over the area of the optical element.

8. A device according to claim 1, wherein the inhomogeneities consist of particles selected from the group comprising glass, plastic, and quartz embedded in a transparent substance applied on a transparent member.

9. A device according to claim 1, wherein the inhomogeneities consist of small impressions or cavities in a transparent substance.

10. A device according to claim 1, wherein the inhomogeneities consist of particles in a colloidal solution in a transparent liquid.

* * * * *